(12) United States Patent
Taniguchi et al.

(10) Patent No.: US 6,895,496 B1
(45) Date of Patent: May 17, 2005

(54) MICROCONTROLLER HAVING PREFETCH FUNCTION

(75) Inventors: Kazuya Taniguchi, Kasugai (JP); Yukisato Miyazaki, Kasugai (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/266,869

(22) Filed: Mar. 12, 1999

(30) Foreign Application Priority Data

Aug. 7, 1998 (JP) .......................................... 10-223813

(51) Int. Cl.$^7$ .............................................. G06F 15/00
(52) U.S. Cl. ........................ 712/207; 712/237; 712/240
(58) Field of Search ................................ 369/207, 234, 369/237, 240; 712/207, 234, 237, 240

(56) References Cited

U.S. PATENT DOCUMENTS

| | | | | |
|---|---|---|---|---|
| 3,573,854 A | * | 4/1971 | Watson et al. | 340/172.5 |
| 3,577,189 A | * | 5/1971 | Cocke et al. | 340/172.5 |
| 4,858,104 A | * | 8/1989 | Matsuo et al. | 712/240 |
| 4,991,080 A | * | 2/1991 | Emma et al. | 364/200 |
| 5,050,076 A | * | 9/1991 | Misaka | 364/200 |
| 5,265,213 A | * | 11/1993 | Weiser et al. | 712/240 |
| 5,442,756 A | * | 8/1995 | Grochowski et al. | 395/375 |
| 5,664,135 A | * | 9/1997 | Schlansker et al. | 395/377 |
| 5,704,053 A | * | 12/1997 | Santhanam | 284/383 |
| 5,790,823 A | * | 8/1998 | Puzak et al. | 712/207 |
| 5,872,978 A | * | 2/1999 | Hoskins | 395/707 |
| 5,948,095 A | * | 9/1999 | Arora et al. | 712/200 |
| 5,961,637 A | * | 10/1999 | Sturges et al. | 712/235 |
| 6,341,370 B1 | * | 1/2002 | Tirumalai et al. | 717/5 |

FOREIGN PATENT DOCUMENTS

| | | |
|---|---|---|
| JP | 3-191427 | 8/1991 |
| JP | 5-274142 | 10/1993 |

* cited by examiner

Primary Examiner—Gautam R. Patel
(74) Attorney, Agent, or Firm—Arent Fox PLLC

(57) ABSTRACT

A microcontroller, connected to a memory which stores instructions and data, includes an instruction execution unit for reading instructions and data from the memory and processing the read instructions and a prefetch circuit unit that receives the instructions and data read from the memory and detects pseudo instructions included in the instructions and data. A pseudo instruction precedes a branch instruction and indicates the existence of the branch instruction and the branch to address. The prefetch circuit unit includes a prefetch buffer connected between the instruction execution unit and the memory for temporarily storing instructions and data being transferred from the memory to the instruction execution unit and a pseudo instruction buffer for temporarily storing instructions and data located at the address of the branch instruction which follows the pseudo instruction. Then, if the branch is taken, the branch to instructions have been prefetched and are immediately available to the instruction execution unit by way of the pseudo instruction buffer.

25 Claims, 5 Drawing Sheets

MICROCONTROLLER HAVING PREFETCH FUNCTION

BACKGROUND OF THE INVENTION

The present invention generally relates to a microcontroller and, more particularly, to a microcontroller that can prefetch instructions and data.

In recent years, the operating speed of microcontrollers has increased along with an increase in the operating frequency. However, the operating speed of peripheral devices such as the memory and interface connected to the microcontroller have not kept pace with that of the microcontroller. In order to improve the processing speed of the entire system, the microcontroller includes a cache memory. However, if data is not found in the cache memory, the data must be transferred to the cache memory from a main memory of the microcontroller. During data transfer, an instruction execution unit of the microcontroller enters the wait state. As a result, the processing speed of the microcontroller is reduced. In particular, when many instructions such as branch instructions are used, the mishit ratio of the cache memory increases, and the processing speed is reduced considerably.

Japan Unexamined Patent Publication No. 3-191427 discloses a microcontroller equipped with a FIFO (first-in-first-out) memory, which is provided between the cache memory and the instruction execution unit. The FIFO memory stores an instruction supplied from the cache memory to the instruction execution unit. The instruction execution unit checks prior to processing whether the instruction stored in the FIFO memory is a branch instruction. The instruction execution unit compares the branch destination address and the tag information of the cache memory when the branch instruction is identified. If the comparison does not produce a match, the instruction execution unit transfers the data group of the main memory referenced according to the branch destination address to the cache memory. By prechecking the instruction, the instruction of the branch destination is stored in the cache memory before the instruction execution unit executes the branch instruction. Accordingly, the mishit ratio of the cache memory is reduced.

However, in order to check the branch instruction, a read circuit, a decoder, and a circuit for generating the branch destination address of the branch instruction are necessary.

Since these circuits have a complicated circuit configuration akin to the instruction execution unit, the circuit area is increased. Further, when the processing of the instruction execution unit is relatively fast, the instructions stored sequentially in the FIFO memory are transferred quickly to the instruction execution unit. Accordingly, storage of the instruction of the branch destination in the cache memory before the processing of the instruction execution unit is delayed. The microcontroller prechecks the branch instruction and prepares the instruction of the branch destination in the cache memory. However, data is not prepared previously in the cache memory. In other words, the aforementioned microcontroller does not support data prefetch.

It is an object of the present invention to provide a microcontroller having improved processing speed and a decreased mishit ratio of instructions and data.

SUMMARY OF THE INVENTION

In one aspect of the present invention, a method is provided that prefetches instructions and data of a program stored in a memory. The program includes a pseudo instruction and at least one of an unconditional branch instruction, a conditional branch instruction, a CALL instruction, and a data calling instruction. The pseudo instruction is arranged before the at least one instruction and indicates that the at least one instruction or data follows the pseudo instruction. At least one instruction address of or data address is part of the pseudo instruction. First, the program is read from the memory, and the pseudo instruction is detected. Then, the instruction or data from the memory is prefetched in accordance with the at least one instruction address or the data address. The prefetched instruction or data is stored in a buffer.

In another aspect of the present invention, a microcontroller includes a buffer, connected to a memory, for storing instructions and data of a program prefetched from the memory. The program includes a pseudo instruction, at least one of an unconditional branch instruction, a conditional branch instruction, a CALL instruction, and a data calling instruction. The pseudo instruction is arranged before the at least one instruction and indicates that the at least one instruction or data follows the pseudo instruction. At least one instruction address or data address is part of the pseudo instruction. An instruction execution unit receives the instruction and data from the buffer and executes a predetermined processing operation using the instruction and data. A pseudo instruction detection unit detects the pseudo instruction included in the program prefetched from the memory. An address control unit prefetches the instruction or data in accordance with at least one instruction address or data address when the pseudo instruction is detected.

In yet another aspect of the present invention, a device detects a pseudo instruction preset before a specific instruction. The pseudo instruction includes an opcode and an operand. The device includes a detection circuit, connected to a data line, for receiving the pseudo instruction transferred on the data line and detecting the opcode included in the pseudo instruction. A detection timing circuit calculates instruction length or the number of operands of the pseudo instruction from the opcode and determining the transfer period of the opcode based on the instruction length or the number of operands. The detection timing circuit supplies a signal for validating the opcode detection operation during an operand transfer period.

In one aspect of the present invention, a recording medium has a program stored thereon. The program includes a pseudo instruction and at least one of an unconditional branch instruction, a conditional branch instruction, a CALL instruction, and a data calling instruction. The pseudo instruction is arranged before the at least one instruction and indicates that the at least one instruction or data follows the pseudo instruction. The at least one instruction address or data address is part of the pseudo instruction.

In another aspect of the present invention, a microcontroller is connected to a memory and stores instructions and data. The microcontroller includes an instruction execution unit for reading instructions and data from the memory and processing the read instructions. A prefetch circuit unit receives instructions and data read from the memory in response to a fetch signal and detects pseudo instructions included in the instructions and data. A pseudo instruction precedes a branch instruction and indicates the existence of the branch instruction. The prefetch circuit unit includes a prefetch buffer connected between the instruction execution unit and the memory for temporarily storing instructions and data being transferred from the memory to the instruction execution unit. A bus interconnects the prefetch buffer and the memory. A pseudo instruction detection unit detects pseudo instructions among the instructions and data being transferred from the memory to the prefetch buffer. A holding circuit stores operands of the pseudo instruction. A pseudo instruction buffer temporarily stores instructions and data fetched from a location in the memory which is pointed to by the branch instruction following the pseudo instruction. An address control unit generates the fetch signal and generates a memory address which points to the address of a next word to be read from the memory. When the pseudo instruction detection unit detects a pseudo instruction, the instructions and data pointed to by the pseudo instruction are fetched from the memory by the address control unit and stored in the pseudo instruction buffer so that when the branch instruction following the pseudo instruction is processed by the instruction execution unit, if the branch is taken, the instructions and data pointed to by the branch instruction have been prefetched and stored in the pseudo instruction buffer.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best understood by reference to the following description of the presently preferred embodiments together with the accompanying drawings in which.

DETAILED DESCRIPTION OF THE PREFERRED EMBODIMENTS

Figure 1:
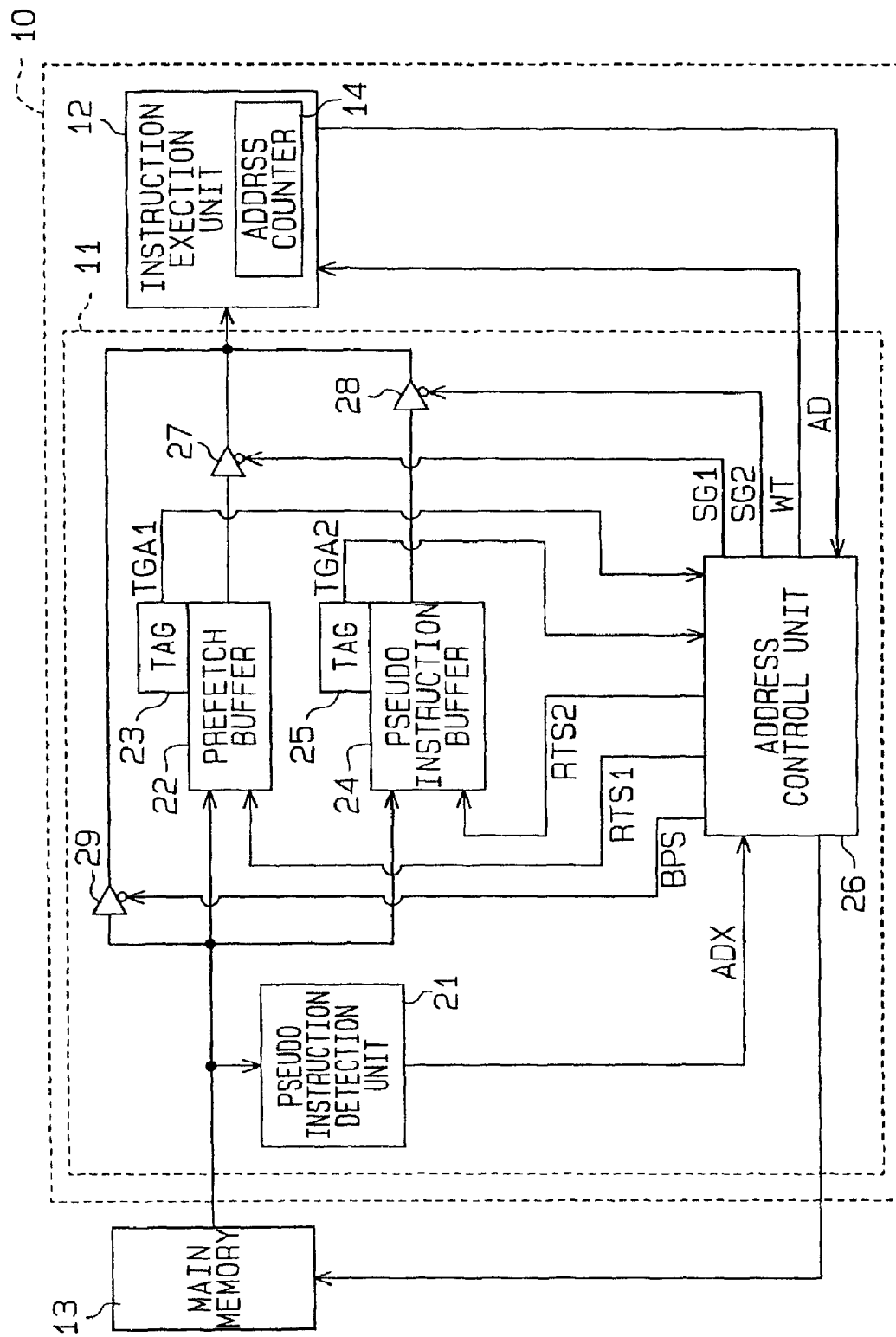
FIG. 1 is a schematic block diagram of a microcontroller according to a first embodiment of the present invention.

In the drawings, like numerals are used for like elements throughout.

First Embodiment

FIG. 1 is a schematic block diagram of a microcontroller 10 according to a first embodiment of the present invention. The microcontroller 10 includes a prefetch circuit unit 11 and an instruction execution unit 12. The microcontroller 10 is preferably embodied as a single chip semiconductor integrated circuit device.

The prefetch circuit unit 11 receives program instructions and program data from a main or external memory 13, such as a ROM (read only memory) or a Flush ROM, and holds the instructions and the data. The instruction execution unit 12 supplies an address AD indicated by an address counter 14 to the prefetch circuit unit 11 to request the instructions and the data to be supplied to the prefetch circuit unit 11. The prefetch circuit unit 11 supplies the instructions or data to the instruction execution unit 12 in accordance with the address AD. The instruction execution unit 12 decodes the received instructions or data and executes necessary processing.

The prefetch circuit unit 11 checks whether a predetermined pseudo instruction is included in the instructions and data transferred from the main memory 13. The pseudo instruction is an instruction located in front of a branch instruction in an assembled program and indicates the existence of the branch instruction. Accordingly, when the pseudo instruction is identified, it is understood that the branch instruction follows the pseudo instruction. Further, the pseudo instruction is defined to be handled in the same manner as a no-operation (NOP) instruction by the instruction execution unit 12. In the present invention, the branch instruction includes an unconditional branch instruction, a conditional branch instruction, a CALL instruction, and a data calling instruction. Further, "1 1 1 1" is assigned to the opcode of the pseudo instruction by an assembler.

The pseudo instruction has four fields (length), including an "instruction (opcode (operation code))", an "additional information (operand)", an "upper address (operand)", and a "lower address (operand)" in this order. The upper address is the upper half of a branch destination address ADX indicated by the corresponding branch instruction. The lower address is the lower half of the branch destination address ADX indicated by the corresponding branch instruction. In the presently preferred embodiment and as described herein, the branch destination address ADX is 8 bits. However, it could be more or less than 8 bits.

The prefetch circuit unit 11 reads the program instruction from the main memory 13 in accordance with the branch destination address ADX indicated by the branch instruction following the pseudo instruction when the pseudo instruction is identified. Accordingly, when the branch instruction following the pseudo instruction is executed by the instruction execution unit 12, the instruction of the branch destination address ADX is already held in the prefetch circuit unit 11. As a result, the instruction execution unit 12 immediately fetches the instruction of the branch destination address ADX without a cache mishit.

The prefetch circuit unit 11 includes a pseudo instruction detection unit 21, a prefetch buffer 22, a prefetch buffer tag memory (hereinafter referred to as a first tag) 23, a pseudo instruction buffer 24, a pseudo instruction buffer tag memory (hereinafter referred to as a second tag) 25, an address control unit 26, first and second gate circuits 27 and 28, and a bypass gate circuit 29. Each of the prefetch buffer 22 and the pseudo instruction buffer 24 is preferably a FIFO (first-in-first-out) memory.

Figure 2:
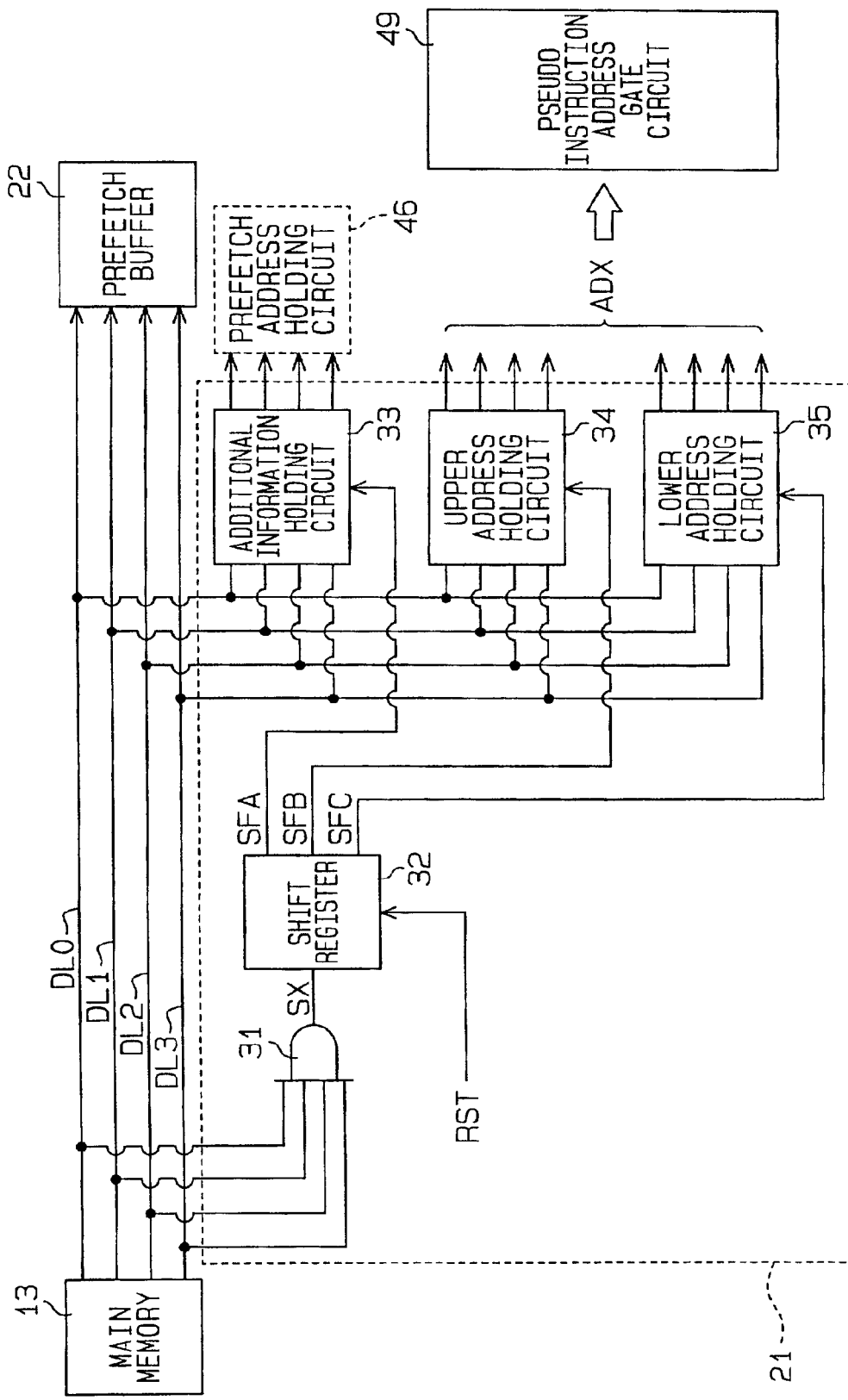
FIG. 2 is a schematic block diagram of a pseudo instruction detection unit of the microcontroller of FIG. 1.

The pseudo instruction detection unit 21 is provided between the main memory 13 and the prefetch buffer 22 and checks whether the program instruction and program data transferred from the main memory 13 to the prefetch buffer 22 are pseudo instructions. Specifically, as shown in FIG. 2, the pseudo instruction detection unit 21 is connected to a 4-bit data line DL1 to DL3 that connects the main memory 13 and the prefetch buffer 22 and receives an instruction and data transferred from the main memory 13 to the prefetch buffer 22 via the data lines DL0 to DL3.

The pseudo instruction detection unit 21 includes a pseudo instruction detection circuit 31, a shift register 32, an additional information holding circuit 33, an upper address holding circuit 34, and a lower address holding circuit 35.

The pseudo instruction detection circuit 31 is preferably an AND circuit having four input terminals respectively connected to the data lines DL0 to DL3. The pseudo instruction detection circuit 31 supplies a detection signal SX High indicating that the transfer instruction is a pseudo instruction to the shift register 32 when all instructions or data on the data lines DL0 to DL3 are H levels (high potential), i.e., "1 1 1 1". When the transfer instruction is not the pseudo instruction, at least one data piece on the data lines DL0 to DL3 is an L level (low potential). Accordingly, the pseudo instruction detection circuit 31 supplies a detection signal SX Low to the shift register 32.

The shift register 32 receives the detection signal SX and a read strobe signal RST. The read strobe signal RST is a clock signal generated in the microcontroller 10. The prefetch circuit unit 11 reads an instruction and data from the main memory 13 in accordance with the cycle of the read strobe signal RST.

Figure 4:
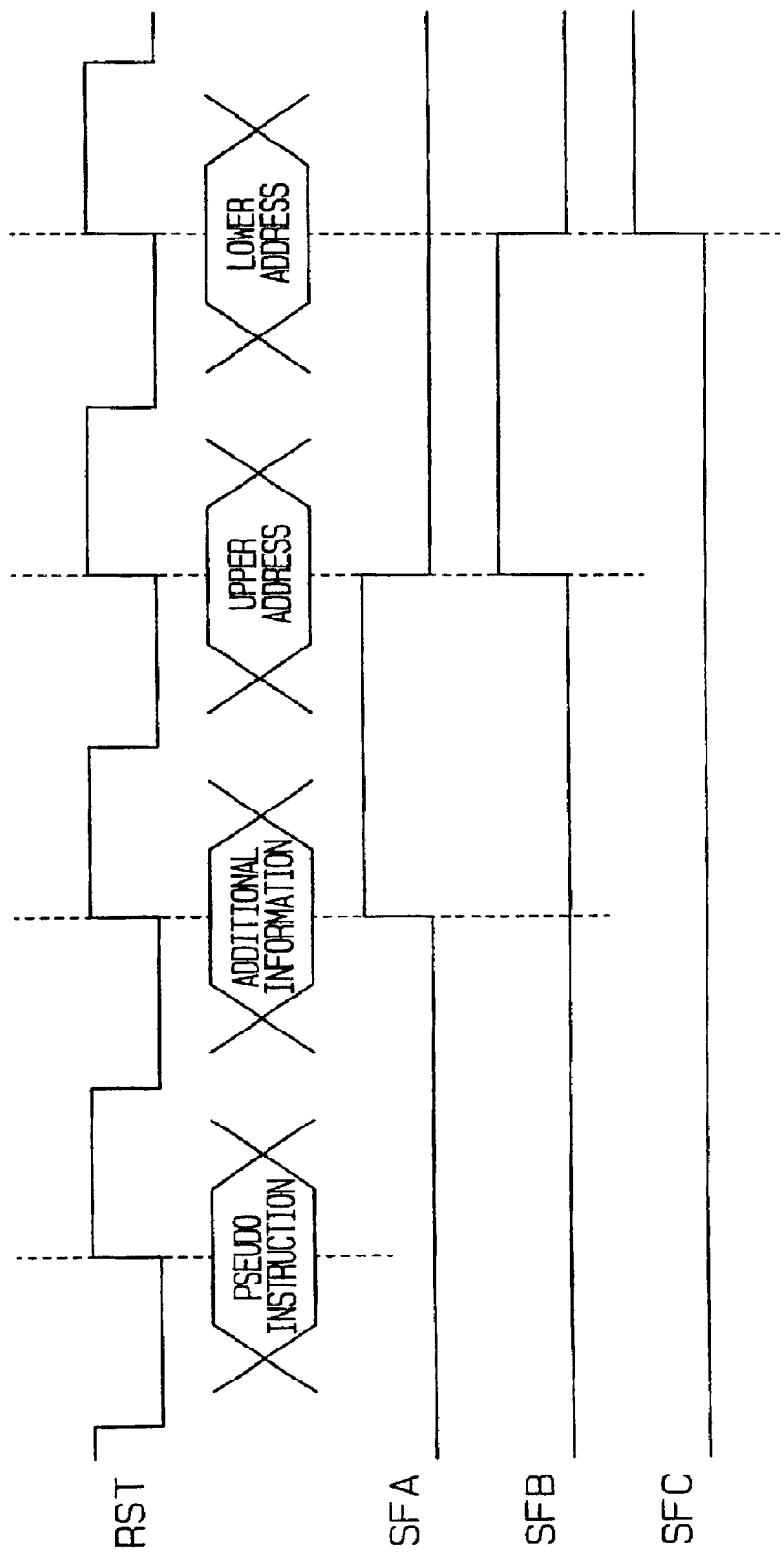
FIG. 4 is a timing chart explaining the operation of the pseudo instruction detection unit of FIG. 2.

The shift register 32 has a three output terminals for supplying hold signals SFA, SFB, and SFC to the holding circuits 33 to 35, respectively. As shown in FIG. 4, the shift register 32 holds the detection signal SX having the H level in response to the rising edge from the L level to the H level of the read strobe signal RST. When a next read strobe signal RST rises in the holding state, the shift register 32 outputs a holding signal SFA High. When the next read strobe signal RST rises in the state of the holding signal SFA High, the shift register 32 outputs a holding signal SFA Low and a holding signal SFB High. Further, a subsequent read strobe signal RST rises in the state of the holding signal SFB High, the shift register 32 outputs a holding signal SFB Low and a holding signal SFC High. When a subsequent read strobe signal RST rises in the state of the holding signal SFC High, the shift register 32 outputs the holding signals SFA, SFB, and SFC Low.

Referring again to FIG. 2, the additional information holding circuit 33 includes four D-type flip-flop circuits (not illustrated) each of which has a data input terminal connected to the data lines DL0 to DL3 and a control input terminal for receiving the holding signal SFA. The four D-type flip-flop circuits hold 4-bit "additional information" on the data lines DL0 to DL3 in response to the holding signal SFA High. In other words, the additional information holding circuit 33 holds the 4-bit "additional information" in response to the holding signal SFA and in accordance with the read strobe signal RST after a 4-bit pseudo instruction has been transferred.

The upper address holding circuit 34 includes four D-type flip-flop circuits (not illustrated) each of which has a data input terminal connected to the data lines DL0 to DL3 and a control input terminal for receiving the holding signal SFB.

The four D-type flip-flop circuits hold the 4-bit "upper address" on the data lines DL0 to DL3 in response to the holding signal SFB High. In other words, the upper address holding circuit 34 holds the 4-bit upper address of the 8-bit branch destination address ADX in response to the holding signal SFB which follows the transfer of the 4-bit "additional information". The 4-bit upper address is supplied in accordance with the read strobe signal RST.

The lower address holding circuit 35 includes four D-type flip-flop circuits (not illustrated) each of which has a data input terminal connected to the data lines DL0 to DL3 and a control input terminal for receiving the holding signal SFC.

The four D-type flip-flop circuits hold the 4-bit "lower address" on the data lines DL0 to DL3 in response to the holding signal SFC High. In other words, the lower address holding circuit 35 holds the 4-bit lower address in the 8-bit branch destination address ADX in response to the holding signal SFC which follows the 4-bit "upper address". The 4-bit lower address is supplied in accordance with the read strobe signal RST. Accordingly, by combining the "upper address" held by the upper address holding circuit 34 and the "lower address" held by the lower address holding circuit 35, the branch destination address ADX is obtained following the pseudo instruction after the second cycle of the read strobe signal RST.

The prefetch buffer 22 acquires the program instruction and program data transferred from the main memory 13 via the data lines DL0 to DL3 in response to a first fetch signal RST1 from the address control unit 26. The prefetch buffer 22 is connected to the instruction execution unit 12 via the first gate circuit 27. When the first gate circuit 27 opens in response to a first gate signal SG1 from the address control unit 26, the instruction and data fetched in the prefetch buffer 22 are transferred to instruction execution unit 12.

The first tag 23 stores the head address and final address in the instruction and data acquired in the prefetch buffer.

The pseudo instruction buffer 24 acquires the program instructions and program data transferred from the main memory 13 via the data lines DL0 to DL3 in response to a second fetch signal RST2 from the address control unit 26. After a pseudo instruction has been detected by the pseudo instruction detection unit 11, the instructions and data pointed to by the pseudo instruction address ADX are transferred from the main memory 13 and stored in the pseudo instruction buffer 24 in accordance with the branch destination address ADX of the pseudo instruction.

The pseudo instruction buffer 24 is connected to the instruction execution unit 12 via the second gate circuit 28.

When the second gate circuit 28 opens in response to a second gate signal SG2 from the address control unit 26, the instructions and data stored in the pseudo instruction buffer 24 are transferred to the instruction execution unit 12. Accordingly, the address control unit 26 controls the acquiring of the instructions and data of the respective buffers 22, 24 and the transfer of the instruction and data to the instruction execution unit 12 from the respective buffers 22, 24.

The second tag 25 stores the head address and the final address of the instructions and data stored in the pseudo instruction buffer 24.

The main memory 13 is connected to the instruction execution unit 12 via the bypass gate circuit 29. When the bypass gate circuit 29 opens in response to a bypass signal BPS from the address control unit 26, the instructions and data are transferred from the main memory 13 to the instruction execution unit 12.

Figure 3:
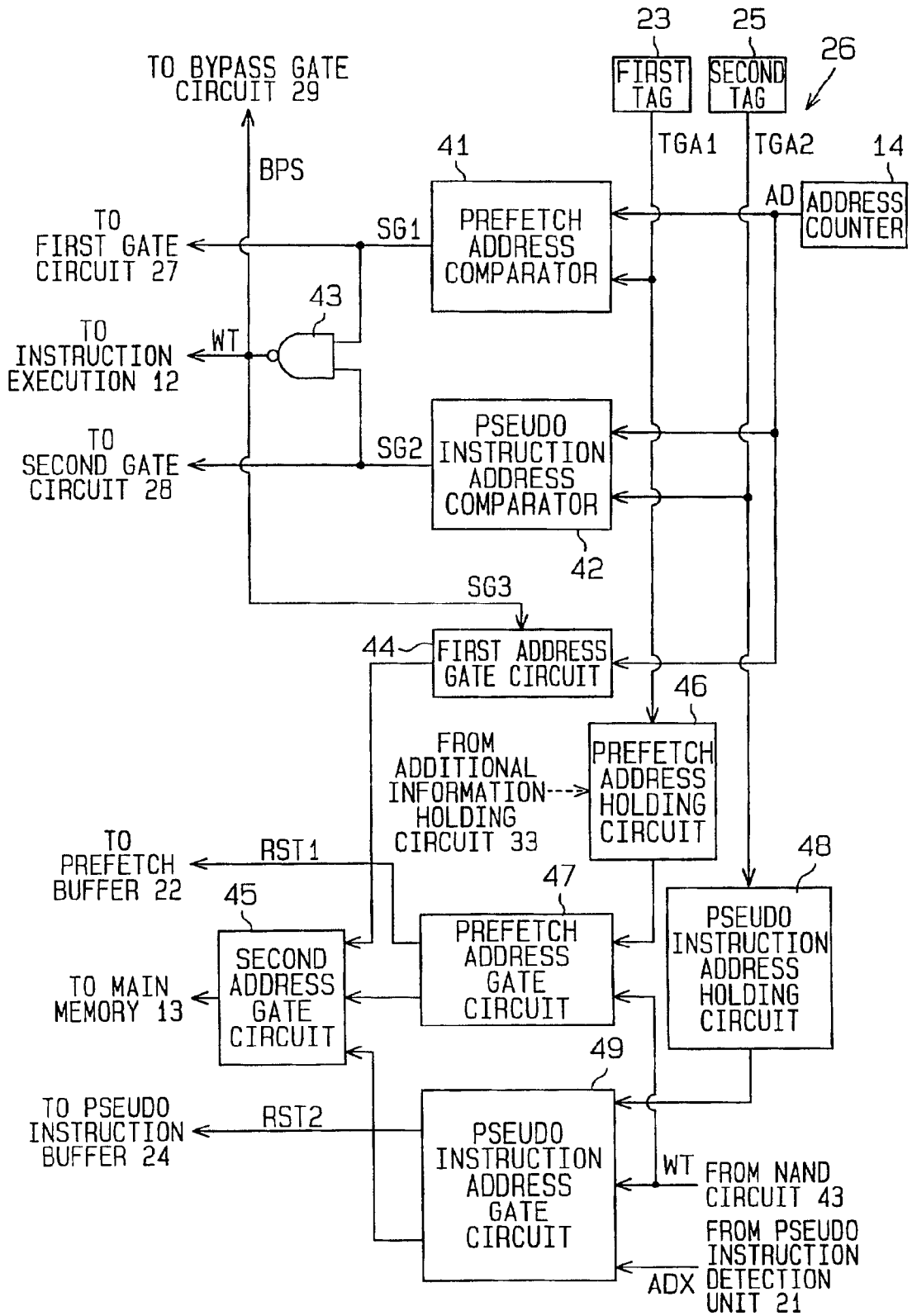
FIG. 3 is a schematic block diagram of an address control unit of the microcontroller of FIG. 1.

FIG. 3 is a schematic block diagram of the address control unit 26. The address control circuit 26 includes a prefetch address comparator 41, a pseudo instruction address comparator 42, a NAND circuit 43, first and second address gate circuits 44, 45, a prefetch address holding circuit 46, a prefetch address gate circuit 47, a pseudo instruction address holding circuit 48, and a pseudo instruction address gate circuit 49.

The prefetch address comparator 41 compares the address AD of the address counter 14 and the address of the first tag 23 and supplies a first gate signal SG1 Low to the first gate circuit 27 when the addresses are the same. The first gate circuit 27 opens in response to the first gate signal SG1 Low, and the instruction or data of the address coincident with the address AD is transferred to the instruction execution unit 12 from the prefetch buffer 22 via the first gate circuit 27. Conversely, when the address AD of the address counter 14 and the address (head address) of the first tag 23 are not the same, the prefetch address comparator 41 supplies a first gate signal SG1 High to the first gate circuit 27. The first gate circuit 27 closes in response to the first gate signal SG1

High. As a result, the instruction or data of the prefetch buffer 22 is not transferred to the instruction execution unit 12.

The prefetch instruction address comparator 42 compares the address AD of the address counter 14 and the address of the second tag 25 and supplies a second gate signal SG2 Low to the second gate circuit 28 when the addresses are the same. The second gate circuit 28 opens in response to the second gate signal SG2 Low, and the instruction or data of the address coincident with the address AD is transferred to the instruction execution unit 12 from the pseudo instruction buffer 24 via the second gate circuit 28. Conversely, when the address AD of the address counter 14 and the address of the second tag 25 are not the same, the pseudo instruction address comparator 42 supplies a second gate signal SG2 High to the second gate circuit 28. The second gate circuit 28 closes in response to the second gate signal SG2 High. As a result, the instruction or data of the pseudo instruction buffer 24 is not transferred to the instruction execution unit 12.

The NAND circuit 43 receives the first and second gate signals SG1 and SG2 from the address comparators 41 and 42 and supplies a wait signal WT Low to the instruction execution unit 12 when the first and second gate signals SG1 and SG2 are the H levels (when it was determined that the address AD and the first address are not the same by the address comparators 41, 42. The instruction execution unit 12 stops its processing operation in response to the wait signal WT Low and waits until a new instruction or data is acquired from either the prefetch buffer 22 or the pseudo instruction buffer 24. In other words, when the wait signal WT is the L level, the instruction execution unit 12 cannot execute processing and waits until a new instruction or data is acquired.

The wait signal WT of the NAND circuit 43 is supplied to the first address gate circuit 44 as a third gate signal SG3. The first address gate circuit 44 receives the address AD from the address counter 14 and supplies the address AD to the second address gate circuit 45 in response to the third gate signal SG3 Low. The second address gate circuit 45 receives the address AD from the first address gate circuit 44 and supplies the address AD to the main memory 13. The main memory 13 receives the address AD from the second address gate circuit 45 and transfers the instruction and data of the address to the prefetch circuit unit 11.

Further, the wait signal WT of the NAND circuit 43 is supplied to the bypass gate circuit 45 as a bypass signal BPS. The bypass gate circuit 29 opens in response to a bypass signal BPS Low, and the instruction and data are directly transferred to the instruction execution unit 12 from the main memory 13 via the bypass gate circuit 29. When the bypass gate circuit 29 closes in response to the bypass signal BPS High, the instruction and data are not directly transferred to the instruction execution unit 12. Thus, the instruction execution unit 12 can directly acquire instructions and data from the main memory 13 via the bypass gate circuit 29 when the instruction or data of the address AD is not stored in the prefetch buffer 22 and the pseudo instruction buffer 24.

The prefetch address holding circuit 46 receives the held final address from the first tag 23 and generates the address following the final address. The next address is the address of the next instruction or data that is acquired by the prefetch buffer 22. The prefetch address holding circuit 46 further generates a full address indicating that the prefetch buffer 22 cannot acquire any more instructions and data when the buffer is full.

The prefetch address gate circuit 47 receives the address from the prefetch address holding circuit 46 and the wait signal WT from the NAND circuit 43, supplies the address following the final address held in the first tag 23 in accordance with a wait signal WT High, and supplies a first fetch signal RST1 to the prefetch buffer 22. The second address gate circuit 45 receives an address from the prefetch address gate circuit 47 and supplies the address to the main memory 13. Accordingly, the main memory 13 supplies the instruction and data of the address to the prefetch buffer 22. The prefetch buffer 22 acquires an instruction and data from the main memory 13 in response to the first fetch signal RST1.

The pseudo instruction address holding circuit 48 receives the held final address from the second tag 25 and generates the address following the final address. The next address is the address of the next instruction and data acquired by the pseudo instruction buffer 24. The pseudo instruction address holding circuit 48 further generates the full address indicating that the pseudo instruction buffer 24 cannot acquire the instruction when the pseudo instruction buffer 24 becomes full.

The pseudo instruction address gate circuit 49 receives the address from the pseudo instruction address holding circuit 48, the wait signal WT from the NAND circuit 43, and the branch destination address ADX from the pseudo instruction detection unit 21. The pseudo instruction address gate circuit 49 supplies the branch destination address ADX or the address following the final address held in the second tag 25 in accordance with the wait signal WT High and supplies a second fetch signal RST2 to the pseudo instruction buffer 24.

The second address gate circuit 45 receives the branch destination address ADX or the next address and supplies the address to the main memory 13. Accordingly, the main memory 13 supplies the instruction and data of the address to the pseudo instruction buffer 24. The pseudo instruction buffer 24 acquires an instruction and data of the address from the main memory 13 in response to the second fetch signal RST2.

The second address gate circuit 45 preferentially selects the address of the first address gate circuit 44 and then selects the address of the prefetch or pseudo instruction address gate circuit 47 or 49. For example, when the address of the pseudo instruction address gate circuit 49 is selected, the address from the prefetch address gate circuit 47 is not selected except for the supply of the address from the first address gate circuit 44. The second address gate circuit 45 continues selecting the address of the pseudo instruction address gate circuit 49 until the address becomes a full address.

Next, the operation of the microcontroller 10 will be described. Hereupon, assume that nothing is stored in the pseudo instruction buffer 24, and the program instructions and program data are transferred from the main memory 13 to the prefetch buffer 22 via the data lines DL0 to DL3. The instruction execution unit 12 receives the program instructions and program data from the prefetch buffer 22 and processes the instructions.

At this time, the prefetch address comparator 41 supplies the first gate signal SG1 Low to the first gate circuit 27, and the NAND circuit 43 outputs the wait signal WT High. The prefetch address gate circuit 47 is supplying the first fetch signal RST1 to the prefetch buffer 22. The pseudo instruction address gate circuit 49 does not supply the second fetch signal RST2 to the pseudo instruction buffer because nothing is stored in the pseudo instruction buffer 24. The second address gate circuit 45 selects the address from the prefetch address gate circuit 47 and supplies the address to the main memory 13.

When the pseudo instruction opcode "1 1 1 1" on the data lines DL0 to DL3 is detected by the pseudo instruction detection circuit 31, the upper and lower address holding circuits 34 and 35 hold the branch destination address ADX of the pseudo instruction. The pseudo instruction address gate circuit 49 receives the branch destination address ADX from the upper and lower address holding circuits 34, 35 and supplies the branch destination address ADX to the second address gate circuit 45 in response to the wait signal WT High. The second address gate circuit 45 receives the branch destination address ADX from the address gate circuit 49 and selects the address ADX and invalidates the first fetch signal RST1 supplied to the prefetch buffer 22 after the address from the prefetch address gate circuit 47 become a full address. When the address ADX is selected, the second address gate circuit 45 supplies the address ADX to the main memory 13, and the pseudo instruction address gate circuit 49 supplies the second fetch signal RST2 to the pseudo instruction buffer 24. The pseudo instruction buffer 24 stores the instruction and data read from the main memory 13 in response to the second fetch signal RST2.

When the instruction and data of the address ADX are transferred to the pseudo instruction buffer 24, the pseudo instruction address holding circuit 48 increments the address AD supplied from the second tag 25 and supplies a new address to the pseudo address gate circuit 49. The new address is supplied to the main memory via the second address gate circuit 45. Thus, the instruction and data of the new address are transferred from the main memory 13 to the pseudo instruction buffer 24, and instructions and data are stored in the pseudo instruction buffer 24 with the branch address ADX at the top.

When the pseudo instruction buffer 24 becomes full, the pseudo instruction address holding circuit 48 supplies a signal indicating a full address to the pseudo instruction address gate circuit 49. The pseudo instruction address gate circuit 49 invalidates the second fetch signal RST2 supplied to the pseudo instruction buffer 24 in accordance with the full address signal and supplies the full address signal to the second address gate circuit 45. The second address gate circuit 45 selects an address supplied from the prefetch address gate circuit 47 in accordance with the full address signal. The prefetch address gate circuit 47 supplies the address supplied from the first tag 23 to the second address gate circuit 45 and supplies the first fetch signal RST1 to the prefetch buffer 22. The prefetch buffer 22 stores the instruction and data of the address of the prefetch address holding circuit 46 read from the main memory 13 in response to the first fetch signal RST1. Thus, the transfer of the instruction and data to the prefetch buffer 22 is restarted.

When the instruction and data of the address are transferred to the prefetch buffer 22, the prefetch address holding circuit 46 increments the address supplied from the first tag 23 and supplies a new address to the prefetch address gate circuit 47. The new address is supplied to the main memory 13 via the second address gate circuit 45. Thus, the instruction and data of the new address are transferred from the main memory 13 to the prefetch buffer 22, and instructions and data are stored in the prefetch buffer 22.

When the prefetch buffer becomes full again, the prefetch address holding circuit 46 supplies a signal indicating a full address to the prefetch address gate circuit 47. The prefetch address gate circuit 47 invalidates the first fetch signal RST1 supplied to the prefetch buffer 22 in accordance with the full address signal and supplies the full address signal to the second address gate circuit 45. The second address gate circuit 45 does not select an address supplied from the prefetch address gate circuit 47 in accordance with the full address signal. Accordingly, the supply of the address to the main memory 13 is stopped.

Next, the characteristics of the microcontroller 10 according to the first embodiment are described.

(1) A pseudo instruction is provided before a branch instruction in an assembled program. The pseudo instruction detection unit 21 detects the pseudo instruction in the instructions and data transferred to the prefetch buffer 22. By detecting the pseudo instruction, the transfer of the branch instruction is forecast before the branch instruction is transferred to the prefetch buffer 22, and the branch destination address ADX is prestored in the pseudo instruction buffer 24. As a result, the instruction execution unit 12 acquires the branch instruction transferred after the pseudo instruction from the pseudo instruction buffer 24 without encountering mishit.

(2) The pseudo instruction detection unit 21 detects the pseudo instruction from the instruction and data transferred on the data lines DL0 to DL3 between the main memory 13 and the prefetch buffer 22. Accordingly, the branch instruction is detected before it is transferred to the prefetch buffer 22, and the branch instruction is prestored in the pseudo instruction buffer 24 in accordance with the branch destination address ADX of the pseudo instruction. As a result, the instruction execution unit 12 acquires the branch instruction transferred after the pseudo instruction without any mishit and executes the branch instruction.

(3) The pseudo instruction detection unit 21 is a simple circuit including the pseudo instruction detection circuit (AND circuit) 31, the shift register 32, and the holding circuits (D-type flip-flop circuits) 33, 34. Accordingly, complexity of the circuit configuration of the microcontroller is prevented.

(4) The pseudo instruction detection unit 21 detects the pseudo instruction before the instruction and data are transferred to the prefetch buffer 22. In other words, in order to detect the pseudo instruction, the instruction and data are transferred between the prefetch buffer 22 and the pseudo instruction detection unit 21. Accordingly, no special and complex circuit for the data transfer is necessary. As a result, complexity of the circuit configuration of the microcontroller is prevented.

(5) The branch destination address ADX is part of the branch instruction. The pseudo instruction detection unit 21 supplies the branch destination address ADX to the address control unit 26 when the pseudo instruction is detected. The branch destination address ADX is supplied to the main memory 13 by the address control unit 26, and the instruction and data at the branch destination address ADX are transferred from the main memory 13 to the pseudo instruction buffer 24. Accordingly, the instruction execution unit 12 is able to immediately acquire the instruction at the branch destination address ADX from the pseudo instruction buffer 24 without any mishit when executing the branch instruction.

(6) While the wait signal WT High is being held (i.e., when the instruction execution unit 12 does not directly read the instruction and data from the main memory 13), the instruction and data are transferred to the prefetch buffer 22 and the pseudo instruction buffer 24. Accordingly, the main memory 13 is used efficiently, and the number of instructions read from the main memory 13 per unit time increases.

(7) The pseudo instruction buffer 24 is provided independently of the prefetch buffer 22. The instruction and data of the jump destination address ADX of the pseudo instruction are transferred to the pseudo instruction buffer 24. Accordingly, while the instruction and data of the address ADX are stored in the pseudo instruction buffer 24, the instruction execution unit 12 acquires the instruction and data from the prefetch buffer 22 in accordance with the address of the address counter 14 and can decode and process the instruction and data.

Second Embodiment

Figure 5:
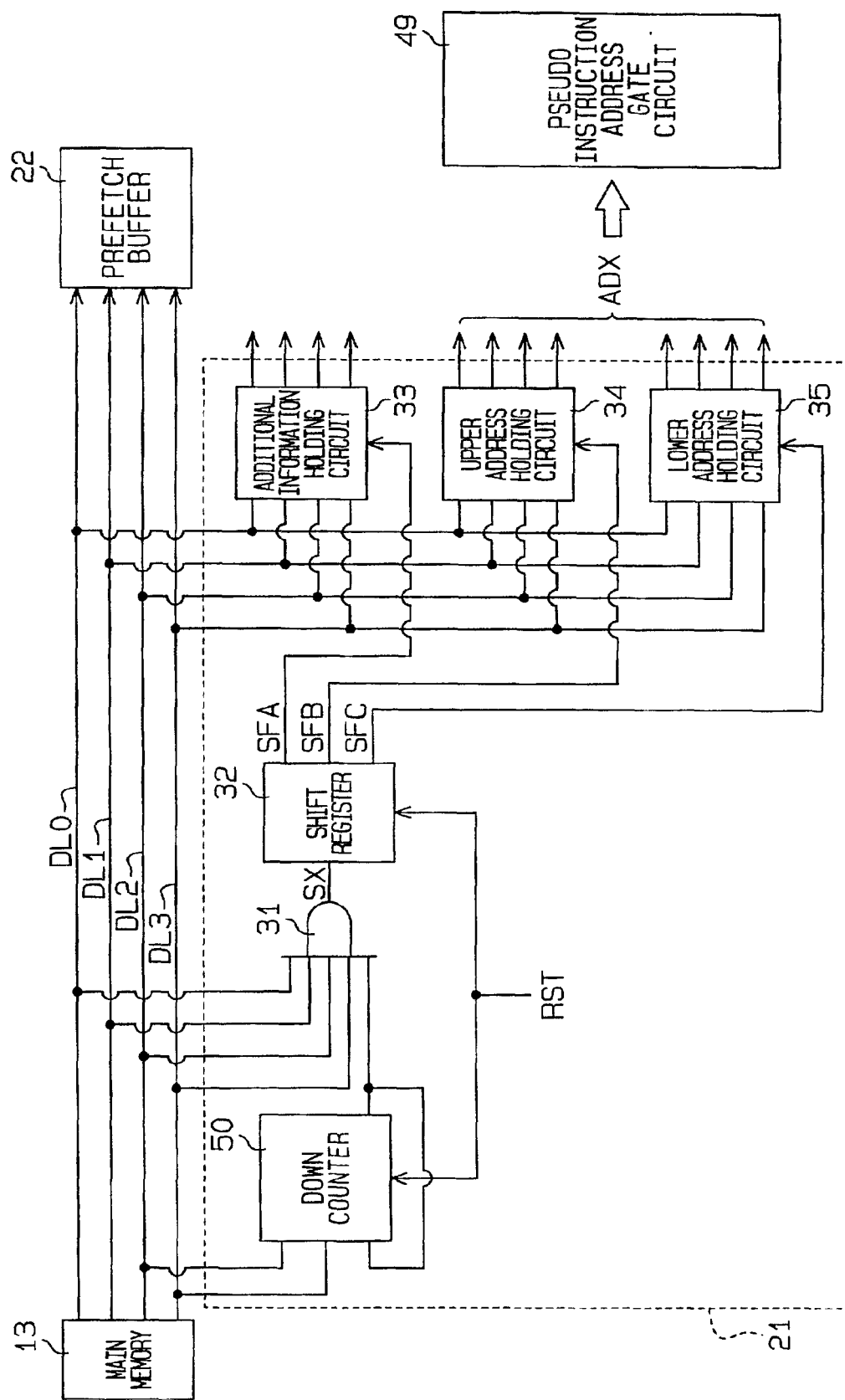
FIG. 5 is a schematic circuit diagram of a pseudo instruction detection unit of the microcontroller according to a second embodiment of the present invention.

FIG. 5 is a schematic block diagram of the pseudo instruction detection unit 21 of the microcontroller according to a second embodiment of the present invention. When an instruction operand is "1 1 1 1", the pseudo instruction detection unit 21 prevents this operand from being incorrectly detected as a pseudo instruction.

As previously discussed, it is preferred that the pseudo instruction opcode is "1 1 1 1". The high-order two bits of the opcode, which are "1 1", are used to define the number of operands associated with the instruction. In this case, there are three pseudo instruction operands (i.e., additional information, upper address, and lower address). When the opcode of an instruction is "1 0 1 1", the high-order two bits of the opcode are "1 0". Accordingly, there are two operands.

That is, the high-order two bits (highest order bit D3 and bit D2) in a 4-bit opcode indicate the number of operands following the opcode. Accordingly, when "D3 and D2" are "0 0", the number of operands is zero. When "D3 and D2" are "0 1", the number of operands is one. When "D3 and D2" are "1 0", the number of operands is two. When "D3 and D2" are "1 1", the number of operands is three.

The pseudo instruction detection unit 21 includes the pseudo instruction detection circuit 31, the shift register 32, the additional information holding circuit 33, the upper address holding circuit 34, the lower address holding circuit 35, and a down counter 50 as a detection timing circuit. The pseudo instruction detection circuit 31 is preferably an AND circuit having five input terminals connected to the data lines DL0 to DL3 and the down counter 50. The pseudo instruction detection circuit 31 outputs a detection signal SX High when the instruction and data on the data lines DL0 to DL3 are all "1" and the output signal from the down counter 50 is "1".

The down counter 50 has a set input terminal connected to the data lines DL3 and DL2 of high-order bits D3 and D2 and control signal input and output terminals connected together. The down counter 50, when the output changes from "0" to "1", holds the value "0", "1", "2", or "3" and sets the value in response to the rising edge of a subsequent new read strobe signal RST. The value "0", "1", "2", or "3" corresponds to D3 and D2 "0 0", "0 1", "1 0", or "1 1", respectively.

The down counter 50 decrements the set value in response to the rising edge of the read strobe signal RST. The down counter 50 supplies an output signal "1" when the subtraction value is "0" and an output signal "1" when the subtraction value is not "0", to the pseudo instruction detection circuit 31. Accordingly, the pseudo instruction detection circuit 31 does not detect the pseudo instruction when the output signal is "0".

When the output signal "1" is supplied to the control signal input terminal, the down counter 50 holds the high-order two bits D3 and D2 on the data lines DL3 and DL2 and outputs the output signal "0". The down counter 50 does not hold the high-order two bits D3 and D2 when the output signal "0" is supplied to the control signal input terminal.

Next, the operation of the pseudo instruction detection unit 21 will be described. Hereupon, assume the pseudo instruction is transferred after an opcode "1 0 X X". Accordingly, the high-order bits D3 and D2 of the opcode are "1 0", and the number of operands is 2.

The pseudo instruction detection circuit 31 receives the opcode "1 0 X X" on the data lines DL0 to DL3 and the output signal of the down counter 50 that changed from "0" to "1", and determines that the opcode is not the pseudo instruction because the opcode "1 0 X X" includes "0". The down counter 50 holds the value "2" corresponding to the high-order bits D3 and D2 "1 0" of the opcode in response to the output signal "1" and outputs the output signal "0".

The down counter 50 then sets the value "2" in response to the rising edge of the read strobe signal RST. At the rising edge of the read strobe signal RST, a first operand is transferred following the opcode "1 0 X X". However, the pseudo instruction detection circuit 31 does not detect the first operand as the pseudo instruction because the output signal of the down counter 50 is "0".

Subsequently, the down counter 50 holds the subtraction value "1" in response to the rising edge of a new read strobe signal RST. At the rising edge of the new read strobe signal RST, a second operand is transferred. However, the pseudo instruction detection circuit 31 does not detect the second operand as the pseudo instruction because the output signal from the down counter 50 is "0".

The down counter 50 holds the value "3" corresponding to the high-order bits D3 and D2 "1 1" in response to the output signal "1" and outputs the output signal "0". Subsequently, even if the three operands are transferred after the opcode of the pseudo instruction, the output signal "0" is output from the down counter 50 during the transfer of the operand. Accordingly, the pseudo instruction detection circuit 31 does not detect an operand as the pseudo instruction. In other words, the detection period of the pseudo instruction detection circuit 31 is limited at the transfer of the opcode. Even if the same operand as the opcode of the pseudo instruction exists, the operand will not be incorrectly detected as the pseudo instruction. As a result, the degree of freedom of program design is improved.

In the second embodiment, the down counter 50 sets the number of operands based on the high-order two bits of the opcode. Instead, the down counter 50 may set the instruction length obtained by adding 1 to the number of operands. In this case, the down counter 50 holds and subtracts the instruction length in response to the rising edge of the read strobe signal RST.

It should be apparent to those skilled in the art that the present invention may be embodied in many other specific forms without departing from the spirit or scope of the invention. Particularly, it should be understood that the invention may be embodied in the following forms.

1) While the branch instruction corresponding to the pseudo instruction is being transferred to the pseudo instruction buffer 24 after the pseudo instruction has been detected by the pseudo instruction detection unit 21, the instruction and data transfer from the main memory 13 to the prefetch buffer 22 may be continued. In this case, the additional information is used. The additional information includes information on the amount of time required until the corresponding branch instruction is transferred to the prefetch buffer 22 after the pseudo instruction has been transferred. For example, as shown in FIG. 3 by a dashed line, the additional information holding circuit 33 supplies the additional information to the prefetch address holding circuit 46. The prefetch address holding circuit 46 supplies a signal for preferentially selecting the address from the pseudo instruction address gate circuit 49 to the second address gate circuit 45 when it identifies the completion of transferring the branch instruction to the prefetch buffer 22 in accordance with the additional information. By using the additional information in this manner, the instruction and data are transferred from the main memory 13 to the pseudo instruction buffer 24 before the branch instruction is executed by the instruction execution unit 12.

2) When the pseudo instruction was detected, without waiting for the fact that the prefetch buffer 22 becomes a full address, the instruction and data transfer to the prefetch buffer 22 are interrupted and the instruction and data of the jump destination address ADX may be transferred to the pseudo instruction buffer 24. In this case, before the instruction execution unit 12 executes all of the instructions from the prefetch buffer 22, the instruction and data of the jump destination address ADX are stored in the pseudo instruction buffer 24. When the pseudo instruction buffer 24 becomes full, the branch instruction and data to be transferred subsequently may be stored in the prefetch buffer 22.

Further, when the transfer of the branch instruction to the prefetch buffer 22 is completed after the pseudo instruction has been detected, the instruction and data transfer to the prefetch buffer 22 may be interrupted. Also in this case, when the prefetch address holding circuit 46 receives the additional information, it supplies a signal for preferentially selecting the address from the pseudo instruction address gate circuit 49, to the second address gate circuit 45 when it identifies the completion of transferring the branch instruction to the prefetch buffer 22 in accordance with the additional information.

3) The pseudo instruction may be set for at least one of the unconditional branch instruction, conditional branch, CALL instruction, and data calling instruction.

4) The address control unit 26 holds the address of one previous instruction or data item to the pseudo instruction when the pseudo instruction was detected. When the address control unit 26 receives the address of the one previous instruction or data item from the address counter 14, it then ignores the address of the pseudo instruction supplied from the address counter 14 and supplies the address of the instruction or data next to the pseudo instruction to the main memory 13. In this case, the instruction execution unit 12 immediately processes the instruction or data next to the pseudo instruction without processing the pseudo instruction.

Accordingly, the processing time of the instruction execution unit 12 is shortened.

5) The address control unit 26 may check whether the instruction and data of the branch destination address ADX of the detected pseudo instruction have already been stored in the pseudo instruction buffer 24, for example, by comparing the branch destination address ADX and the tag information of the first and second tags 23 and 25. When the instruction and data have already been stored, the instruction and data are not prefetched. This check prevents useless prefetch and enables efficient prefetch.

6) An opcode for different pseudo instructions may be set for the unconditional branch instruction, conditional branch instruction, CALL instruction, and data calling instruction.

In this case, the additional information of the pseudo instruction of the unconditional branch instruction may be set. The address control unit 26 prefetches the instruction and data based on the additional information until the transfer of the unconditional instruction to the prefetch buffer 22 is completed and stores the jump destination instruction and data in the pseudo instruction buffer 24 after having transferred the unconditional instruction.

Further, the additional information of the pseudo information of the conditional branch instruction may be set. The address control unit 26 prefetches the instruction and data based on the additional information until the transfer of the conditional branch instruction to the prefetch buffer 22 is completed and alternately stores the jump destination instruction and data in the pseudo instruction buffer 24 and the instruction and data in the prefetch buffer 22. It is preferable that the buffer switching timing is determined on the number of transfer instructions and data pieces.

The additional information of the pseudo instruction of the CALL instruction may be set. The address control unit 26 prefetches the instruction and data based on the additional information until the transfer of the CALL instruction to the prefetch buffer 22 is completed, stores the jump destination instruction and data in the pseudo instruction buffer 24 after having transferred the CALL instruction, and subsequently restores the instruction and data in the prefetch buffer 22.

The additional information of the pseudo instruction of the data calling instruction may be set. The address control unit 26 prefetches the instruction and data based on the additional information until the transfer of the data calling instruction to the prefetch buffer 22 is completed, stores the instruction and data required for the pseudo instruction buffer 24 after having transferred the data calling instruction, and subsequently stores the instruction and data in the prefetch buffer 22.

7) One pseudo instruction opcode "1 1 1 1" for the unconditional branch instruction, conditional branch instruction, CALL instruction, and data calling instruction may be set. Further, additional information for discriminating the unconditional branch instruction, conditional branch instruction, CALL instruction, and data calling instruction may be set.

8) The pseudo instruction may be set so that the unconditional branch instruction, conditional branch instruction, CALL instruction, and data calling instruction may be discriminated, respectively. Further, an exclusive pseudo instruction buffer may be set for each of the unconditional branch instruction, conditional branch instruction, CALL instruction, and data calling instruction. For example, the address control unit 26 stores the jump destination instruction and data of the address in the buffer for the unconditional branch instruction when the pseudo instruction of the unconditional branch instruction was detected.

9) The opcode of the pseudo instruction for the unconditional branch instruction, conditional branch instruction, and the CALL instruction may be set to "1 1 1 1", and the opcode of the pseudo instruction for the data calling instruction may be set to "1 1 1 0". When the lowest order bit of the opcode is set to "0", the pseudo instruction for the data calling instruction differs from another pseudo instruction. In this case, the pseudo instruction detection circuit 31 receives the high-order three bits of the opcode on the data lines DL1 to DL3, and the address control unit 26 receives the lowest order bit of the opcode on the data line DL0. The address control unit 26 determines the pseudo instruction for the data calling instruction based on the detection of the pseudo instruction by the pseudo instruction detection circuit 31 and the fact that the lowest order bit is "1" or "0". The address control unit 26 further prefetches the instruction and data until the transfer of the data calling instruction to the prefetch buffer 22 when the pseudo instruction for the data calling instruction is detected. The address control unit 26 subsequently stores the instruction and data in the prefetch buffer 22 after the instruction and data required for the pseudo instruction buffer 24 have been stored.

10) The priority information may be included in the additional information of the pseudo instruction. The address control unit 26 may preferentially prefetch the prefetch buffer 22 or may preferentially prefetch the pseudo instruction buffer 24 based on the additional information.

11) The prefetch buffer 22 and the pseudo instruction buffer 24 may be cache memories instead of FIFO memories.

12) The prefetch buffer 22 and the pseudo instruction buffer 24 may be buffers of the FIFO memory having a large storage capacity. In this case, for example, when the pseudo instruction is detected, the address control unit 26 prefetches the instruction and data until the transfer of an instruction for the pseudo instruction to the buffer is a completed and subsequently stores the jump destination instruction and data to the end.

Therefore, the present examples and embodiments are to be considered as illustrative and not restrictive and the invention is not to be limited to the details given here, but may be modified within the scope and equivalence of the appended claims.

What is claimed is:

1. A method for prefetching a program stored in a memory, the method comprising the steps of:
    reading the program from the memory, wherein the program includes a pseudo instruction and at least one instruction, the pseudo instruction being arranged before the at least one instruction and including an address for an instruction;
    detecting the pseudo instruction with a first unit;
    reading the instruction from the memory in accordance with the address for the instruction with the first unit when the pseudo instruction is detected;
    storing the instruction in a buffer;
    executing the at least one instruction following the pseudo instruction without executing the pseudo instruction; and
    executing the stored instruction with a second unit.

2. The method of claim 1, wherein the first unit includes a pseudo instruction detection unit connected in parallel with the buffer, wherein the step of detecting the pseudo instruction includes supplying the program read from the memory to the pseudo instruction detection unit in parallel with the buffer.

3. The method of claim 1, wherein the buffer includes first and second buffers connected in parallel to the memory, and the method further comprising a step of storing the instruction read from the memory in the first buffer and storing the instruction included in the detected pseudo instruction in the second buffer.

4. The method of claim 3, further comprising the steps of:
    identifying that the at least one instruction following the pseudo instruction has been transferred to the first buffer with the first unit when the pseudo instruction is detected; and
    prefetching the instruction from the memory in accordance with the at least one instruction address with the first unit after the transfer of the at least one instruction to the first buffer has been identified.

5. The method of claim 4, further comprising the step of identifying that the corresponding instruction is stored in the second buffer in accordance with the address when the pseudo instruction is detected, wherein the prefetch step is executed when the corresponding instruction is not stored in the second buffer.

6. The method of claim 1, further comprising the steps of:
    identifying that the at least one instruction following the pseudo instruction has been transferred to the buffer with the first unit when the pseudo instruction is detected; and
    prefetching the instruction and the data from the memory in accordance with the address with the first unit after the transfer of at least one instruction to the buffer has been identified.

7. The method of claim 6, further comprising the step of identifying that the corresponding instruction is stored in the buffer in accordance with the address with the first unit when the pseudo instruction is detected, wherein the prefetch step is executed when the corresponding instruction is not stored in the buffer.

8. The method of claim 1, further comprising handling the pseudo instruction as a no-operation (NOP) instruction when the pseudo instruction is detected.

9. The method of claim 1, further comprising the second unit ignoring an address for the pseudo instruction when receiving the address for the instruction to skip the pseudo instruction.

10. The method of claim 1, wherein the stored instruction is executed in a next cycle after the at least one instruction is executed.

11. The method of claim 1, further comprising holding an address of at least one previous instruction when the pseudo instruction is detected.

12. A microcontroller, comprising:
    a buffer, connected to a memory, for storing a program read from the memory, wherein the program includes a pseudo instruction and at least one branch instruction, the pseudo instruction being arranged before the at least one instruction and including an address for a an instruction;
    a first unit including,
    a pseudo instruction detection unit, connected to the memory, for detecting the pseudo instruction included in the program read from the memory; and
    an address control unit, connected to the memory and the pseudo instruction detection unit, for reading the instruction from the memory in accordance with the address for the instruction when the pseudo instruction is detected and storing the instruction in the buffer; and
    a second unit connected to the buffer, for executing the at least one instruction following the pseudo instruction without executing the pseudo instruction, wherein the second unit executes the instruction stored in the buffer.

13. The microcontroller of claim 12, wherein the buffer includes first and second buffers connected in parallel to the memory, wherein the first buffer stores the instruction read from the memory, and the second buffer stores the instruction included in the detected pseudo instruction.

14. The microcontroller of claim 13, wherein the address control unit identifies that the corresponding instruction is stored in the second buffer in accordance with the address when the pseudo instruction is detected and permits storage of the instruction in the second buffer when the corresponding instruction is not stored in the second buffer.

15. The microcontroller of claim 14, wherein the pseudo instruction detection unit is connected in parallel with the first buffer for the memory.

16. The microcontroller of claim 12, wherein the address control unit identifies that the corresponding instruction is stored in the buffer in accordance with the address when the pseudo instruction is detected and permits storage of the instruction in the buffer when the corresponding instruction is not stored in the buffer.

17. The microcontroller of claim 16, wherein the pseudo instruction detection unit is connected in parallel with the buffer for the memory.

18. The microcontroller of claim 12, wherein the second unit handles the pseudo instruction as a no-operation (NOP) instruction when the pseudo instruction is detected.

19. The microcontroller of claim 12, wherein the second unit ignores an address for the pseudo instruction when receiving the address for the instruction to skip the pseudo instruction.

20. A method for prefetching a program stored in a memory, the method comprising the steps of:

reading the program from the memory, wherein the program includes a pseudo instruction and at least one instruction, the pseudo instruction being arranged before the at least one instruction and including an address for an instruction;

detecting the pseudo instruction with a first unit;

prefetching the instruction in accordance with the instruction with the first unit when the pseudo instruction is detected;

handling the pseudo instruction as a no-operation (NOP) instruction when the pseudo instruction is detected with a second unit; and executing the at least one instruction following the pseudo instruction with the second unit without executing the pseudo instruction.

21. A method for prefetching a program stored in a memory, the method comprising the steps of;

reading the program from the memory, wherein the program includes a pseudo instruction and at least one instruction, the pseudo instruction being arranged before the at least one instruction and including an address for an instruction;

detecting the pseudo instruction with a first unit when the pseudo instruction is detected;

prefetching the instruction in accordance with the detection of the pseudo instruction with the first unit;

when receiving the address for the instruction with a second unit, which is independent of the first unit, and skipping the pseudo instruction; and executing the at least one instruction following the pseudo instruction without executing the pseudo instruction, and executing the prefetched instruction.

22. An apparatus for prefetching a program stored in a memory, the apparatus comprising:

a first unit for reading the program from the memory, wherein the program includes a pseudo instruction and at least one instruction, the pseudo instruction being arranged before the at least one instruction and including an address for an instruction, and wherein the first unit detects the pseudo instruction and prefetches the instruction when the pseudo instruction is detected; and a second unit for executing a no-operation (NOP) operation in accordance with the detection of the pseudo instruction and executing the at least one instruction without executing the pseudo instruction.

23. An apparatus for prefetching a program stored in a memory, the apparatus comprising:

a first unit for reading the program from the memory, wherein the program includes a pseudo instruction and at least one instruction, the pseudo instruction being arranged before the at least one instruction and including an address for an instruction, and wherein the first unit detects the pseudo instruction and prefetches the instruction when the pseudo instruction is detected; and a second unit for executing the prefetched instruction, wherein the second unit ignores an address for the pseudo instruction when receiving the address for the instruction to skip the pseudo instruction, and wherein the second unit executes the at least one instruction without executing the pseudo instruction.

24. An apparatus for prefetching a program stored in a memory, the apparatus comprising:

a first unit for reading the program from the memory, wherein the program includes a pseudo instruction and at least one instruction, the pseudo instruction being arranged before the at least one instruction and including an address for an instruction, and wherein the first unit reads the instruction from the memory in accordance with the address for the instruction when the pseudo instruction is detected, wherein the first unit includes a buffer for storing the instruction; and a second unit for executing the at least one instruction following the pseudo instruction without executing the pseudo instruction, wherein the second unit executes executing the stored instruction.

25. A method for prefetching a program stored in a memory, the method comprising the steps of:

reading the program from the memory, wherein the program includes a pseudo instruction and at least one data calling instruction, the pseudo instruction being arranged before the data calling instruction and including an address for calling data;

detecting the pseudo instruction with a first unit;

reading the data from the memory in accordance with the address for the calling data with the first unit when the pseudo instruction is detected;

storing the data in a buffer; and executing the data calling instruction with a second unit without executing the pseudo instruction.

* * * * *